United States Patent [19]

Neff

[11] 4,048,617
[45] Sept. 13, 1977

[54] RETRACE DATA ELIMINATION

[75] Inventor: Marion W. Neff, Irving, Tex.

[73] Assignee: Recognition Equipment Incorporated, Dallas, Tex.

[21] Appl. No.: 593,118

[22] Filed: July 3, 1975

[51] Int. Cl.² .............................................. G06K 9/00
[52] U.S. Cl. ..................... 340/146.3 SY; 340/146.3 Z
[58] Field of Search ............... 340/146.3 SY, 146.3 Z; 235/61.11 E, 61.12 N

[56] References Cited

U.S. PATENT DOCUMENTS

| 3,744,025 | 7/1973 | Bilgutay | 340/146.3 Z |
| 3,778,597 | 12/1973 | Vanderpool et al. | 340/146.3 Z |
| 3,811,033 | 5/1974 | Herrin et al. | 340/146.3 Z |

Primary Examiner—Joseph M. Thesz
Attorney, Agent, or Firm—John E. Vandigriff

[57] ABSTRACT

This invention relates to modification and utilization of signals developed by automatic reading systems where a hand-held optical unit scans a data field or alphanumeric characters, and more particularly, to operations which eliminate redundancy in signals produced by scanning a given data field in either direction. A higher first line accept rate is achieved.

9 Claims, 4 Drawing Figures

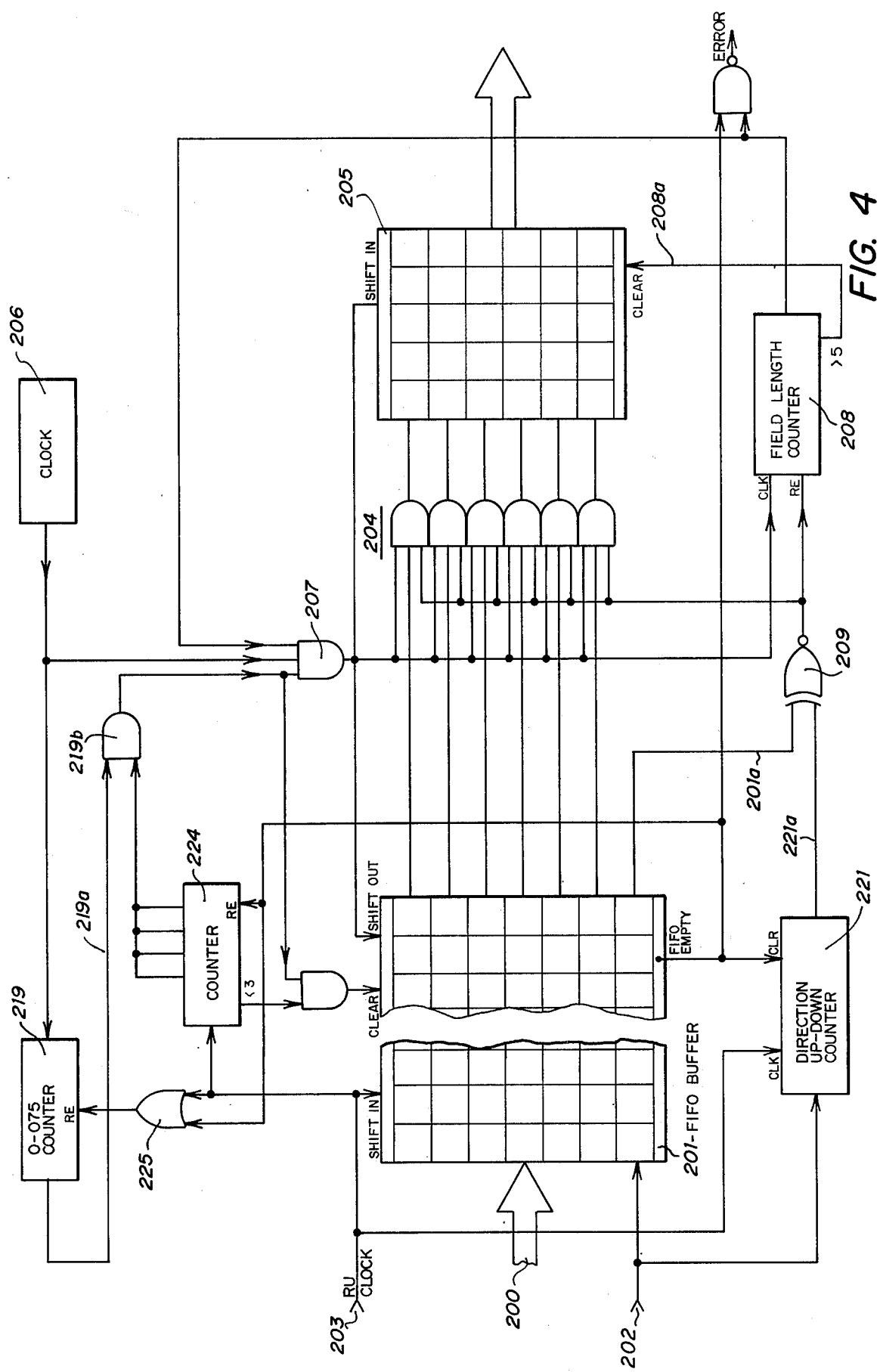

RETRACE DATA ELIMINATION

In automation of the input of data such as in point of sale transactions, invoicing and the like, scanning systems of various types are employed. In point of sale systems, for example, price and inventory information automatically is listed from specified data fields on articles of merchanise. Bar codes of various types are used where optical scanning systems respond to movement of a bar coded field past the reading station.

In U.S. pat. application Ser. No. 505,931, entitled Character Recognition Unit, an optical reading system is disclosed wherein a hand-held wand containing optical sensors is drawn across a data filed. Alpha-numeric data thus read is then utilized for providing to a customer, for example, a tabulation of a plurality of sales as well as providing to store management a detailed record of transactions for inventory control and other management purposes.

The system disclosed in the aforementioned patent application has been found to work satisfactorily and is in substantial use in systems where alpha-numeric information is utilized on merchanise tags. It has been found that individual operators utilizing the hand scan unit have different personal responses to the challenge of executing scan operations. Typically on a given tag, there are several lines to be read, each line comprises a separate data field. The lines are arranged parallel to each other, one above the other. When the first of several lines is to be read it is frequently found that the operator momentarily reverses the direction of movement of the hand-held wand. This results in some members of the data set in a given field being scanned twice, three times, or more.

The present invention is directed to recovery and utilization of such data where the scan direction is changed but where, at some time in the scan of a given data field, all of the data is read in a one direction traverse, i.e., without reversal of direction of movement. This permits utilization of many sets of data otherwise discarded. This is true particularly where the reversal of scan direction occurs at the beginning of the first line on a multiline tag of label.

In accordance with the invention, strings of signals representing characters read from a given data field are stored. A signal indicating the direction of movement of the wand is produced at the time each character is read. A reference condition is then produced indicative of the majority direction. Thereafter, any of the stored signals produced while reading in the nonmajority direction are discarded. Any string of stored signals, the number of which corresponds to the number of elements on the data field read and stored in serial relationship, then that set is utilized.

DESCRIPTION OF THE DRAWINGS

For a more complete understanding of the present invention, and for further objects and advantages thereof, reference is now made to the following description taken in conjunction with the accompanying drawings in which:

FIG. 4 is a circuit diagram in simplified form illustrating the essential steps of the flow diagram of FIG. 3.

FIG. 1 illustrates an optical scanning system such as used at point of sale operations. A wand 10 is adapted to be grasp in a hand and moved as to scan a tag 11. Tag 11 contains three data fields. The first data field 12 represents the department (D) in which the merchandise is purchased. Field 13 represents the catalog number or the identification (M) of the particular piece of merchanise. Field 14 represents the purchase price ($).

Figure 1:
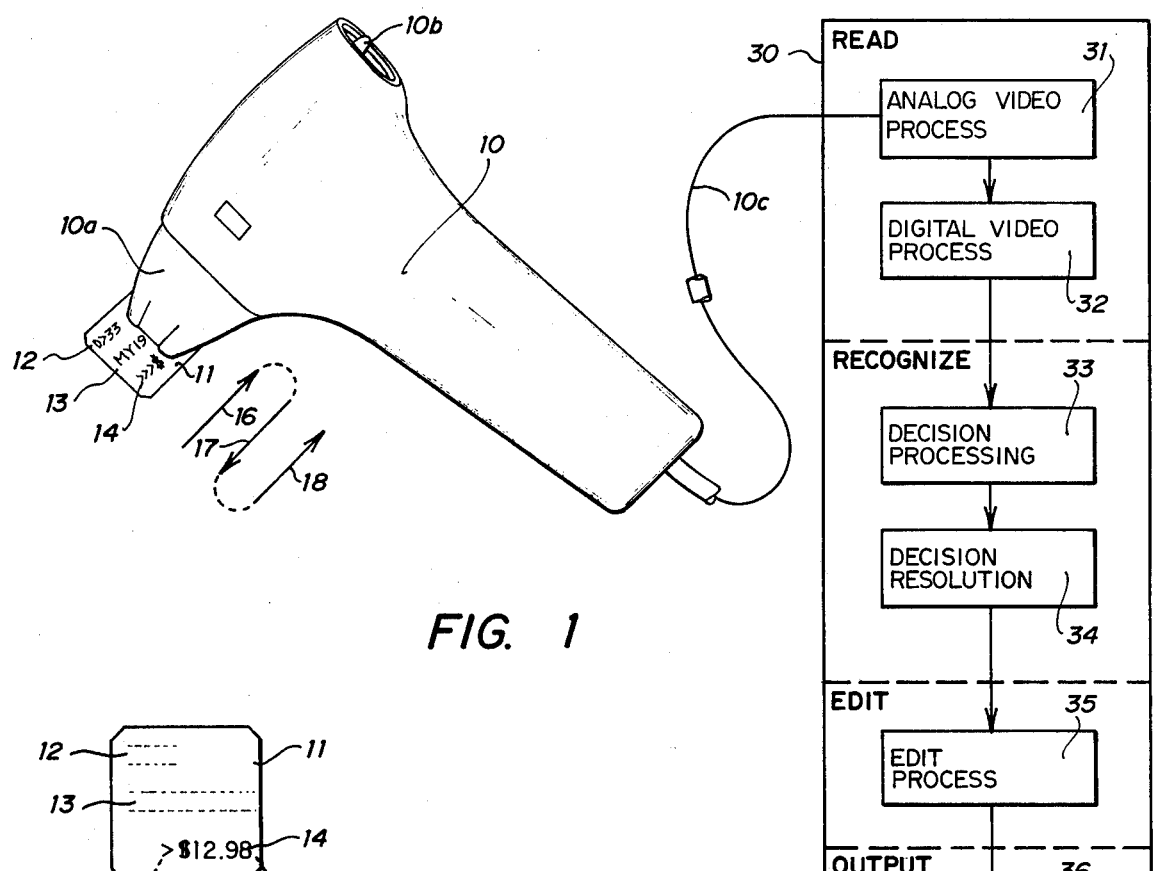
FIG. 1 illustrates a typical system in which the present invention is employed.

In the embodiment currently available on the market, wand 10 has an aperture in the bottom of the nose piece 10a through which light passes to illuminate the surface of the tag 11 and through which the reflected light is sensed by light-sensitive arrays. In operation, the system responsive to the output of the wand 10, generates a train of multidigital words representative of the data in each of the three fields 12, 13 and 14. This train appears on out-put line 15. In that system, the processing unit achieves reading of the data in field 12-14 regardless of the direction that the scan is performed. The OCR wand is simply passed over a line of data, either left-to-right or right-to-left, to lift the character images off of the paper. Characters are then recognized, edited, and transmitted to the data recording device to which the OCR wand is interfaced. Each of the field is preceeded by an operation code (D, M or $). In the particular system involved, the recognition operations are constrained so that code field 12 must be read first followed by field 13, and finally, field 14 is read. When this order is followed, then the data is accepted by the system.

The system involving wand 10 was designed and accommodates and facilitates the human function of propelling it across the data field in such a manner as to permit the electronics to sense the data in each field. In spite of all of the study and engineering directed to accommodation of human, it has been found that there is a relatively high incidence of failure to properly read the first line in each set of data to be read. It has been found that after the first line is successfully read, then the second and third lines can be read without nearly so high an incidence of reject rates. In any case, a non-monotonic traverse can occur and introduce ambiguity. Thus, the present invention is directed towards a system which reduces rejection rates and is particularly fruitful in connection with first line reading operations.

More particularly, field 12 may be scanned by passing wand 10 in the direction indicated by arrow 16 with the nose piece adjacent to field 12. Following a scan of field 12, field 13 is scanned right to left, as indicated by 18. The system thus accommodates a Z-type trajectory as indicated by the dotted lines interconnecting arrows 16-18.

Figure 2:
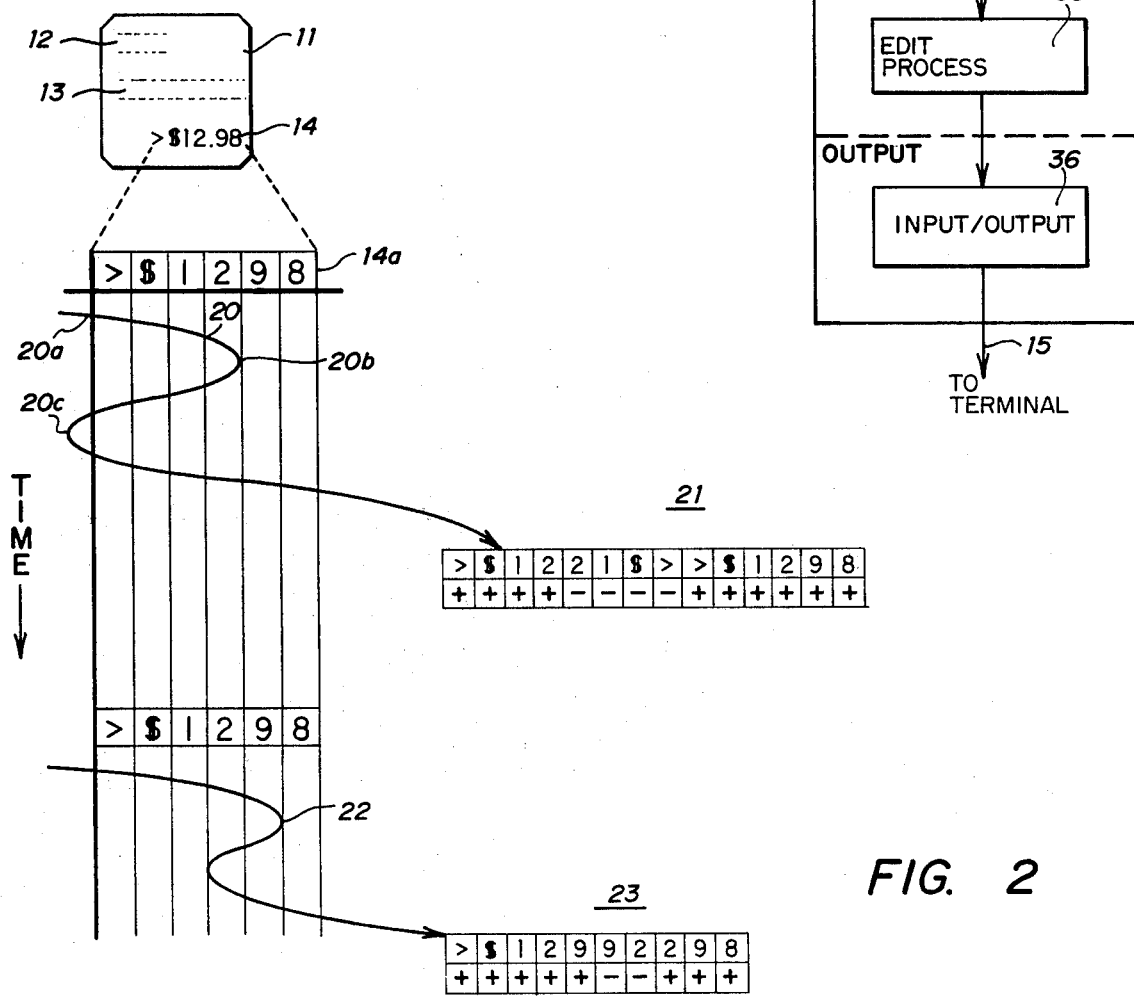
FIG. 2 illustrates a scan sequence of an optical hand-held wand.

High reject rates are encountered because traverse of a field often is of the character illustrated in FIG. 2. For example, in FIG. 2, the price data field 14 of tag 11 has been reproduced on an expanded graphical scale to provide a plot of a trajectory as a function of time. Specifically, data field 14a represents as ordinates the spacing across the tag 11 and the abscissae of the graph are in terms of time. In this instance, the operator failed to execute a monotonic movement of the wand across the data field 14. Rather it would move from a start 20a in a positive (+) direction to a reversal point 20b. The wand was then moved back past the margin of the field 14a in a negative (−) direction to reversal point 20c and thereafter followed a complete trajectory across the data field in a positive (+) direction. Table 21 represents an output produced by following the scan trajectory of 20. That is, table 21 contains the characters recognized by the electronics associated with the wand 10 along with an indication of the direction that the wand was moving at the time each of the characters of the data field 14 was scanned.

In the trajectory between the start and the inflection point 20b, the wand is moved in a positive direction and read the first column of the field which is a filler symbol. A dollar sign and then the numerals 1 and 2 were read. Upon reaching the inflection point 20b, a portion of the field was retraced, reading in the negative direction, the numerals 2, 1 the dollar sign and the filler element. Following inflection point 20c, it again read the data in the entire field, namely, the filler, when the dollar sign, and numerals 1289. The last traverse was all in the positive direction, thus, completing the entire field.

Heretofore, when such a string of data is produced involving rescan, the date has been discarded and a signal provided, such as by illumination of the lamp 10b, (FIG. 1), to indicate to the operator that there was a failure to read the data field. Upon such signal, the operator again scans the data field until successful. The operator then proceeds to additional data fields and then to new tags.

In accordance with the present invention, as long as the entire field ultimately is scanned while elements thereof are read in the direction of reading of the majority of the elements, then the data is saved and rescanning is not required. Thus, if the data is of the character illustrated by table 21, this data would be saved and rescan would not be required. However, in the data plotted in table 23, the data would be discarded and rescan would be required. In this example, scan trajectory 22 is plotted as a function of data field length and time. Read in the positive direction was the filler and symbol $; 1, 2 and 9, all while moving in a positive direction. While moving in the negative direction (−), symbols 9 and 2 were read. Then in the positive (+) direction, the symbols 2, 9 and 9 were read. In this case, the data is discarded and a rescan is required.

Having now an understanding of the objective of the present invention, i.e., to reduce the data reject rate, reference is again made to FIG. 1. Wand 10 is connected by way of a cable 10c to a processing unit 30. The processing unit includes a READ section an analog-video process unit 31 and a digital video process unit 32. A decision processing unit 33 and a decision resolution unit 34 are part of the RECOGNITION function of the system. An EDIT process unit 35 serves to refine the data and an I/O unit 36 serves to transfer the ultimate information from unit 30 by way of the output channel 15.

The present invention is situated in the edit process unit 35.

Briefly stated, the invention involves modifying a set of data from a hand scan character recognition system where data signals, Table 21, accompanied by scan direction signals, Table 21, issue for each scan a plurality of data field characters. A storage unit receives the data signals and the direction signals from which a majority direction signal is established.

Thereafter, only those data signals are utilized from storage for which the associated direction signal is the same sense as the sense of the majority directions signal.

Utilization of any string of data signals having members in excess of members in the data field is prevented.

FIG. 3

Figure 3:
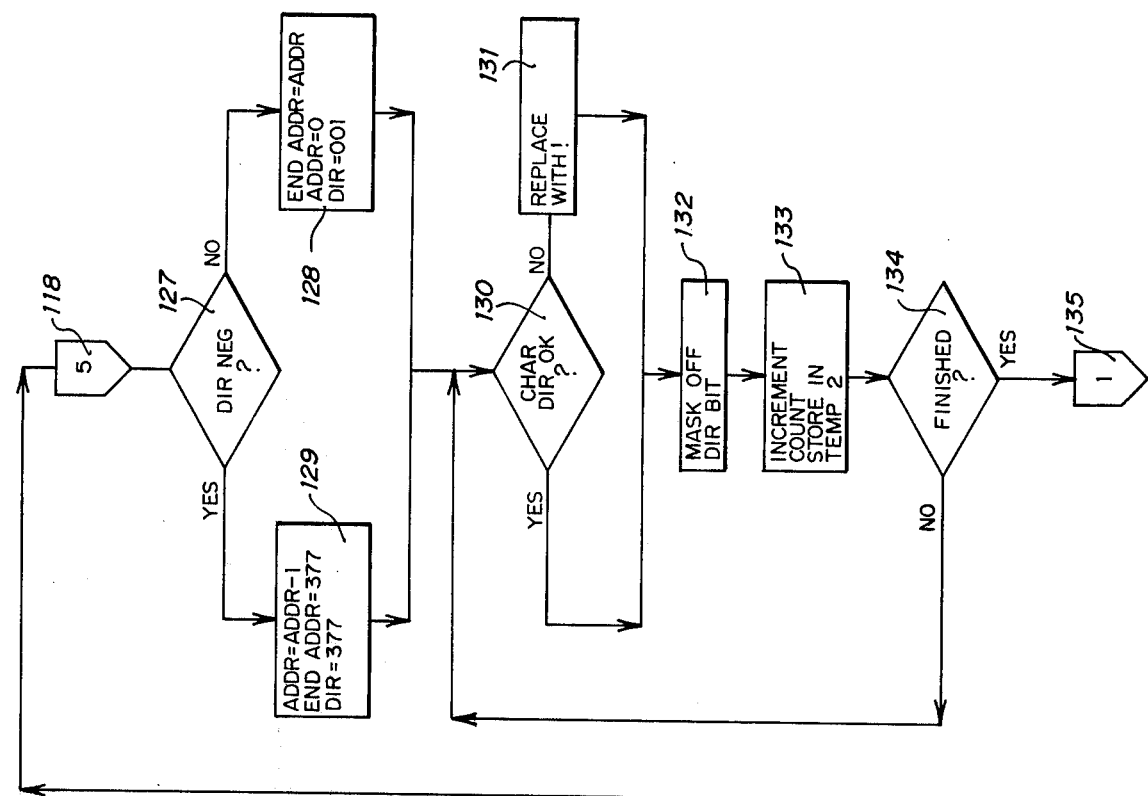
FIG. 3 illustrates a flow chart depicting the operation of the present invention.
Figure 3:
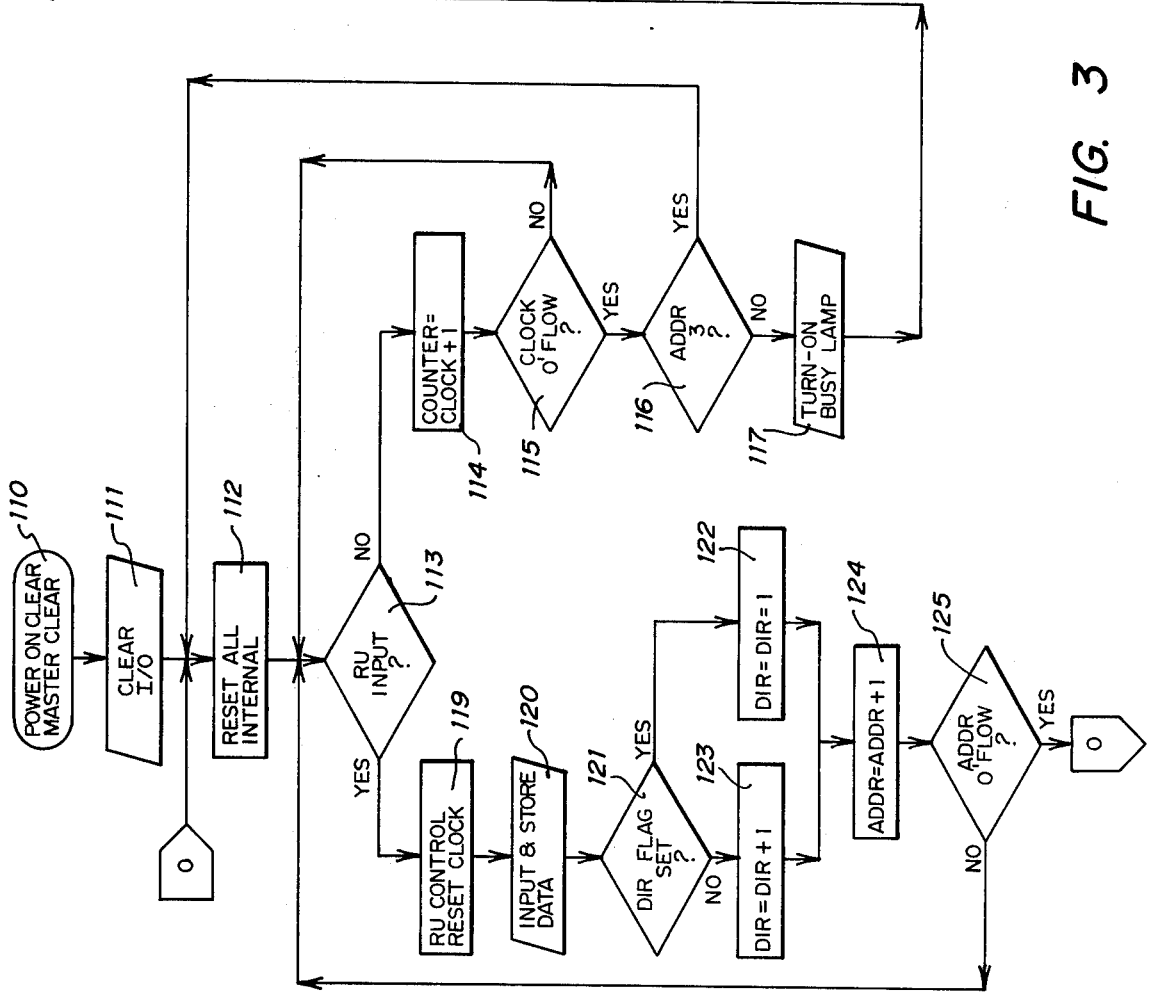

Referring to FIG. 3, a series of steps are illustrated in a flow chart which are encompassed in operation of edit process unit 35. The flow chart illustrates modification of signal train produced in optical scanning system of the type shown in FIG. 1. Trains of multibit digital signals representative of the alpha-numeric and other symbols contained in the data scanned field are processed in accordance with the series of steps of FIG. 3:

In step 110, the system is initialized as power is turned on.

In step 111, the input/output channels are all cleared.

In step 112, internal counters are reset.

In step 113, a check is made to determine whether or not the recognition unit (RU) 31–34 FIG. 1 has supplied a multibit signal representative of a given character.

In step 114, a counter is incremented with each of a series of timing clock pulses. The counter used in step 114 is preset to provide an output (in step 115) when the counter of step 114 has been incremented through a preset period of time.

In one embodiment of the present invention, there is an overflow output in step 115 if the counter employed in step 114 has not been reset in less than 0.075 seconds. So long as this time interval has not been registered in step 114, then the system continues to check for the presence of an input signal from the RU.

Each time the preset time interval is registered on the counter of step 114, then the overflow signal is checked in step 116 to see if that condition has occurred less than three times, i.e., if less than three characters have been input from the RU as sensed in step 113. If there have been less than three characters then in response to step 116, all internal counters are reset and the system continues to check for signals from the RU. This permits the system to operate even though there may be one or two spurious signals received. However, if there have been three or more signals received, then in step 117 a busy lamp is energized in the wand so that the wand operator will know that the system is then editing the results of a just completed pass of the wand across a data field.

When in step 113 the indication is that an RU output signal has been received, then in step 119, the counter employed in step 114 is reset. In step 120, the data from the RU is then entered into a storage register. It is entered at the rate of one multibit character per RU clock pulse.

In step 121, a flag is set dependent upon whether the movement of the wand across the data field is from right to left (no) or from left to right (yes). If it is in the direction right to left, (no) then a direction counter is incremented in step 123. If the scan direction is from left to right, then a direction counter is decremented in step 122.

In step 124, a register is incremented each time an RU word is brought into storage in step 120. This provides an indication as to how many words have been placed in storage from the RU.

In step 125, a check is made to see if the storage is overloaded. So long as it is not, then in step 127 a check is made to see if the direction counter has a true or false output indicating a right to left or left to right scan direction, respectively. If the scan direction is right to left (no) then the address in storage of the last character read is given a high order address for a readout or utilization purposes. This is accomplished in step 128. If the scan direction was from left to right, then the end address remains the end address for readout purposes as indicated in step 129. Thereafter, in step 130, a check is made to determine for each character signal stored in storage, whether or not it was read while the wand was moving in the direction the wand moved during the reading of the majority of the characters.

In step 131, if the answer to the inquiry in step 130 is "no", then the character is discarded or replaced with an error symbol (!). If the check in step 130 is positive or "yes," then the character is transferred or utilized.

In step 132, a direction bit accompanying each multibit word from the RU is at this point masked off, i.e., not further used. In step 133, a counter is incremented to provide control when the contents of the input storage unit have all been tested by the criteria involved.

In step 134, if all of the data words in storage have not been so tested then the loop is again traversed back to step 130. If all of the words have been tested then the resultant set of data may be utilized as indicated in step 135. Such utilization would be by a cash register or by an inventory control data keeping system.

In FIG. 4 a circuit diagram has been shown wherein a train of multibit words is received asynchronously from a character RU of the type shown in FIGS. 1 and 2.

In FIG. 4, a multibit input channel 200 leads to a first in/first out (fifo) buffer 201. In the form illustrated herein, buffer 201 may be 32 bits long and seven bits wide. Each word on channel 201 is a six bit word. Simultaneously, a seventh bit is input by way of line 202. This bit represents the direction of travel of the wand at the instant that the character represented by the first six bits is read and recognized.

A clock input channel 203 is connected to the first in/first out buffer 201. Thus, as data words are received from the RU, they are stored sequentially.

The RU clock line 203 leads to the shift in terminal of the buffer 201. The RU clock line 203 also is connected to the input of a counter 224 and to the reset input of a counter 219 by way of OR gate 225. Counter 224 registers the number of words that are input to buffer 201. Counter 219 is a timer counter that counts up to 0.075 seconds before an output appears on line 219a and is reset by each word entered into buffer 201.

Line 219a is connected by way of an AND gate 219b to one terminal of an AND gate 207. The RU clock line 203 is also connected to the clock input terminal of a direction counter 221. The direction bit line 202 is also connected to the up-down input terminal of the up-down counter 221.

The outputs of the fifo buffer 201 are connected by way of a bank of AND gates 204 to the input of an output buffer 205. Buffer 205 is six bits wide and is of length determined by the length of a given data field to be read and thus, may be considered tailored to the length of the data field.

A timing clock 206 is connected to the clock input of counter 219 and, by way of AND gate 207, to the shift out terminal of the fifo buffer 201, to the shift in terminal of the buffer 205 and to one input terminal of each of the AND gates 204. The output of AND gate 207 is also connected to the clock input terminal of a data field length counter 208. The output of the direction counter 221 and the direction bit output of the fifo buffer register 201 are connected through an exclusive NOR unit 209 to the reset input terminal of the counter 208 and to one input terminal of each of the AND gates 204.

In operation, the clock 206 continuously runs. Counter 219 counts in response thereto. Each time a multibit data word is received by way of channel 200, the clock pulse on line 203 resets the counter 219.

When the counter 224 reaches a count of three or more, AND gate 219b is enabled. Thus, after three or more words, are stored in buffer 201, if there is any interval between the last word and the next succeeding word greater than 0.075 seconds, the counter 219 causes the output line of AND gate 219b to be enabled. Thus, a first input of AND gate 207 is provided.

Clock 206 is connected directly to a second input of AND gate 207. The third input is provided by the output of the field length counter 208. As long as counter 208 has not counted up to its preset value, the AND gate 207 is enabled clock pulses from clock 206 enable the transfer of words in buffer 201 to the buffer 205 by energizing the shift-out terminal of buffer 201 and the shift-in terminal of buffer 205. This process continues as long as the clock 208 has not reached its count and as long as the output of exclusive OR gate enables AND gates 204. However, if the state of the direction bit line 201a differs from the state on the output from the direction counter 221, i.e., on line 221a, then transfer to buffer 205 will be inhibited. Transfer will be permitted only as long as the states on lines 201a and 221a agree.

The data field counter 208 is preset to have the same number of bits as words accommodated by the buffer 205. Thus, the data transfer will continue as long as the counter 208 has not reached its count. When it does reach its count, AND gate 207 is disabled. When it exceeds the preset count indicating the presence of more characters read than allowed in the data field, then register 205 is cleared by way of line 208a. For the example given, field 14 has five characters, i.e., can accommodate a price range from 0 to $999.99, Counter 208 provides an output on line 208a when the count therein exceeds 5.

The foregoing operation rectifies the ambiguity that would otherwise be present in a data string illustrated in FIG. 2.

While the foregoing examples have dealt with the use of the system in the setting illustrated in FIG. 1, i.e., the lifting of data from a tag on an article of merchandise at a point of sale terminal, it is to be understood that other data input operations may be carried out utilizing a system such as shown in FIG. 1 which system includes the system for eliminating redundancy because of rescan of a given field. For example, purchase orders may be provided with data in prescribed fields and with prescribed operation codes so that data can be lifted and utilized by the system of FIG. 1. Insurance premium notices may also be provided with prescribed data fields and each characterized by an operation code so that data can be scanned by hand held units. Thus, the invention is not limited to the point of sale operations.

In FIG. 4, the system has been shown including a fifo buffer register 201. Such units are well known in the art and are manufactured and sold by various vendors. In the embodiment disclosed, the buffer is 32 bits long and 7 bits wide. It operate such that words input by way of channel 200 enter the first column of the buffer 201 and are funneled to the output part immediately and are there held with succeeding words stacked next in order adjacent to the output. Gates 204 then control the selective transfer of the data from buffer 201 to output register 205.

While not shown in FIG. 4, it will be understood that circuitry may be provided to enter data into register 205 selectively from the output side thereof as well as the input so that the data read in the direction of arrow 17, FIG. 1 may be reordered to be read out of the register 205 in the same order as data read during scans represented by arrows 16 and 18.

In FIG. 1, it has been indicated that a Z-type of trajectory has been employed for reading the three fields on tag 11. It will be understood that the field may be read by scanning all in the direction of arrow 16 or all in the direction of arrow 17. The system 30 in FIG. 1 may then be set to accommodate the data read from either direction by reordering, for example, the data read into the shift register 205 of FIG. 4.

FIG. 3 indicates the general flow of data and the logic involved in utilization of data even though there has been a rescan traverse of a given field. FIG. 4 illustrates a wired logic arrangement for carrying out the basic functions of the portion of the flow diagram of FIG. 3 involving the rescan treatment.

It will be recognized from FIG. 3 that the functions carried out in the system of FIG. 4 can be executed by programming a mini-computer through software. Table 2 sets forth a program listing in a F/8 assembler language that portion of the flow diagram of FIG. 3 between steps 118 and 135. Column 1 contains the instruction address. Column 2 contains the machine instructions in octal code. Column 3 (mnemonic) describes each instruction.

TABLE II

```
                    .  STATE 5 DETERMINES THE DIRECTION OF THE INPUT STRING. FIRST,
                    .  THE INPUT STRING COUNT IS CHECKED FOR LESS THAN 3 INPUT CHARACTERS,
                    .  NEXT THE DIRECTION VOTE IS MADE AND THEN ALL CHARACTERS WITH BAD
                    .  DIRECTION ARE REJECTED AND THE DIRECTION BIT IS MASKED OFF. THE INPUT
                    .  STRING BEGINS AT LOCATION 040 IN THE SCRATCHPAD.
                    .  THE END ADDRESS OF THE INPUT STRING IS IN REGISTER 8
                    .  FOLLOWING ARE OUTPUTS
                    .  THE TOTAL STRING COUNT IS IN REGISTER 5
                    .  THE DIRECTION VALUE OF + OR -1 IS IN REGISTER 6
                    .  THE DIRECTION BIT IS EITHER SET OR RESET IN REGISTER 4
000626  157     EDIT   LISL     1
000627  143            LISU     3
000630  114            LR       A,XS         FETCH END ADDRESS
000631  125            LR       ENDADD,A     STORE END ADDRESS
000632  044            AI       -040         SUBTRACE THE START ADDRESS
000633  340
000634  045            CI       2            TEST FOR LESS THAN 3 CHARACTERS
000635  002
000636  201            BP       JPO          JUMP TO STATE 0 JUMP POINT
000637  166
000640  130            LR       CNT1,A       STORE FOR PASS 1 LOOP COUNT
000641  123            LR       CNT2,A       STORE FOR PASS 2 LOOP COUNT
000642  160            LIS      0
000643  124            LR       UDDC,A       CLEA9 THE UP/DOWN COUNTER
                    TAKE THE DIRECTION VOTE ON PASS1
000644  012     ST58   LR       A,IS         FETCH THE POINTER
000645  037            INC                   INCREMENT IT
000646  013            LR       TS,A         PLACE BACK IN ISAR
000647  064            DS       UDDC         DECREMENT DIRECTION COUNT FOR NEGATIVE
000650  354            XS       XS           FETCH A CHARACTER AND TEST DIRECTION
000651  221            BM       ST5A         BRANCH IF NEGATIVE DIRECTION
000652  005
000653  104     POS1   LR       A,UDDC       FETCH THE DIRECTION COUNT
000654  044            AI       2            ADD TWO FOR POSITIVE
000655  002
000656  124            LR       UDDC,A STORE
                                         IT
000657  070     ST5A   DS       CNT1         DECREMENT THE PASS 1 LOOP COUNTER
000660  224            BNZ      ST5B         LOOP
000661  363
                    SET THE DIRECTION BIT AND +1 OR -1 COUNT ON PASS 2
000662  161            LIS      1            SET DIRECTION TO POSITIVE
000663  126            LR       DIR,A
000664  344            XS       UDDC         FETCH THE DIRECTION COUNT AND TEST
000665  201            BP       ST5C         BRANCH IF POSITIVE
000666  004
000667  040            LI       -1           LOAD THE -1 COUNT
000670  377
000671  126            LR       DIR,A        STORE THE NEGATIVE DIRECTION
000672  041     ST5C   NI       DMSK         ISOLATE THE DIRECTION BIT
000673  200
000674  124            LR       DBIT,A
                    SCAN FOR DIRECTION REJECTS AND MASK OUT THE DIRECTION BIT
000675  114     NXC1   LR       A,XS         FETCH A CHARACTER
000676  344            XS       DBIT         COMPARE WITH THE CORRECT DIRECTION
000677  201            BP       SAME         THEY ARE THE SAME
000700  003
000701  040            LI       041          LOAD THE EXCLAMATION POINT CODE
000702  041
000703  134     SAME   LR       XS,A         RESTORE THE CHARACTER TO THE BUFFER
000704  012            LR       A,IS
000705  044            AI       -1
000706  377
000707  013            LR       IS,A
000710  063            DS       CNT2         DECREMENT THE PASS 2 LOOP COUNT
000711  224            BNZ      NXC1         CONTINUE IN THE LOOP UNLESS FINISHED
000712  363
```

What is claimed is:

1. A system for modifying a set of data signals in a hand scan character recognition system where each data signal representative of a character has an associated scan direction signal generated as a data field, which includes a plurality of data field characters, is scanned comprising:

a. storage means to receive said data signals, b. means responsive to said direction signals to establish a majority direction signal corresponding to the direction for which the greatest number of data signals have been generated, and c. means operable to utilize only those data signals from said storage means for which the direction signal is the same sense as the sense of said majority direction signal.

2. The combination set forth in claim 1 in which means are provided to discard data signals when they exceed a predetermined number indicating the presence of more characters read than allowed in a data field.

3. A system for modifying a data signal in a hand scan character recognition system where each data signal is accompanied by a scan direction signal as a plurality of data field characters is scanned comprising:

a. storage means to receive said data signals and said direction signals, b. means responsive to said direction signals to establish a majority direction signal corresponding to the direction for which the greatest number of data signals have been generated, and c. means operable to transfer only those data signals from said storage means for which the direction signal is the same sense as the sense of said majority direction signal.

4. In a hand scan character recognition system where each data signal is accompanied by a scan direction signal as a plurality of data field characters is scanned, the combination comprising:

a. storage means to receive all data signals from the scan of a data field, b. means responsive to said direction signals to establish a majority direction signal corresponding to the direction for which the greatest number of data signals have been generated, and c. comparison means operable upon transfer of said data signals from said storage means for discard of any data signal having an associated direction signal the sense of which differs from the sense of said majority direction signal.

5. The combination set forth in claim 4 including a second comparison means for discarding said data signals when said data signals include more characters than can be accommodated in said data field.

6. A system of claim 4 wherein:

a. said storage means receiving said data signals and said direction signals is a first in, first out buffer register, and b. said means to establish a majority direction signal is an up-down counter.

7. The system of claim 4 wherein data signals for which the direction signal is the same sense as the sense of said majority direction signal are selectively stored at a rate different than said character recognition rate.

8. A method of modifying a set of data signals in a hand scan character recognition system where each data signal has an associated scan direction signal generated as a plurality of data field characters are scanned comprising:

a. storing said data signals in real time relation to said scan, b. generating a majority direction signal in response to the scan direction signals representative of the direction in which the greatest number of data signals have been generated, and c. utilizing only those stored data signals for which the direction signal is the same sense as the sense of said majority direction signal.

9. The method set forth in claim 8 in which said data signals are utilized only when they do not exceed in number the data field characters of said data field.

* * * * *